United States Patent [19]  [11]  4,332,698
Bernstein et al.  [45]  Jun. 1, 1982

[54] CATALYST SHEET AND PREPARATION

[75] Inventors: Philip Bernstein, Glen Ridge, N.J.; James P. Coffey; Alan E. Varker, both of Warwick, N.Y.; John T. Arms, Monroe; William D. K. Clark, Warwick, both of N.Y.; Paul D. Goodell, Ridgewood, N.J.

[73] Assignee: MPD Technology Corporation, Wyckoff, N.J.

[21] Appl. No.: 226,457

[22] Filed: Jan. 19, 1981

[51] Int. Cl.³ .................. B01J 31/06; B01J 31/28; B01J 31/34; B01J 35/02
[52] U.S. Cl. .................. 252/430; 252/426; 252/477 R
[58] Field of Search .............. 252/425.3, 426, 430, 252/477 R; 429/42

[56] References Cited

U.S. PATENT DOCUMENTS

| 3,121,029 | 2/1964 | Duddy | 429/219 |
| 3,375,208 | 3/1968 | Duddy | 521/28 |
| 3,838,092 | 9/1974 | Vogt et al. | 260/33.6 F |
| 3,898,099 | 8/1975 | Baker et al. | 252/182.1 |
| 3,930,094 | 12/1975 | Sampson et al. | 429/42 X |
| 4,058,482 | 11/1977 | Baris et al. | 252/425.3 |

Primary Examiner—W. J. Shine
Attorney, Agent, or Firm—Raymond J. Kenny; Miriam W. Leff

[57] ABSTRACT

A catalyst composition is provided as a thin flexible sheet in standard polymer processing equipment. The catalyst is comprised of catalyst particles encradled in a porous, fiber-containing polymeric material.

16 Claims, No Drawings

CATALYST SHEET AND PREPARATION

This invention relates to a catalyst and a method of preparation thereof. More particularly, it concerns the preparation of a catalyst as a porous, thin film.

BACKGROUND OF THE INVENTION

It is desirable in some processes to use a catalyst in the form of a thin, flexible sheet or membrane, e.g., a liner in a tubular reactor or in a conduit for waste streams from a reactor to remove pollutants. It would be convenient to have a catalyst in a thin, flexible sheet which is manageable and can be readily fitted in the walls of a reactor. It would be advantageous to have maximum access to the catalyst material in the film or sheet. It also would be advantageous to have the catalytically active material in the sheet in a form which would permit volumetric changes in the catalyst in use, without destroying the integrity of the material.

In accordance with the present invention, a catalyst composition is provided in the form of a thin, flexible composition in which the active catalyst particles are encradled in a fiber-containing polymeric material, the polymeric material preserving the integrity of the catalyst while permitting maximized access to the catalyst particles.

THE INVENTION

In accordance with the present invention, a thin, flexible catalyst sheet is provided in which the active catalyst component is in the form of finely divided particles encradled in porous fiber-containing polymeric material.

The thin, flexible catalyst sheet is prepared by mixing catalyst particles with a tripartite system disclosed in co-pending U.S. application Ser. No. 226,454, filed Jan. 19, 1981 and made a part hereof. The tripartite system is comprised of: (1) a fibrillatable first polymer, (2) a support-contributing second polymer, and (3) a major amount of a pore-former which is removable, can be uniformly dispersed in the system and wets or can be made to wet the surface of the catalyst particles, said three components of the system being compatible with each other and said polymers being inert or at least not harmful in the environment in which the catalyst will be used.

In a preferred embodiment of the present invention, the fibrillatable first polymer is developed into the catalyst composition in-situ under a dry processing technique. Apart from the wider-choice this offers in selection of catalysts, the use of a dry processing technique for the fibrillatable polymer makes it possible to carry out the preparation of the polymeric catalyst composition in standard polymer processing equipment. In such equipment, the fibrillatable polymer can be converted to fibrous form, the composition can be made substantially homogenous, and the catalyst composition can be produced in sheet form.

DETAILED DESCRIPTION OF THE INVENTION

As indicated above, the polymeric active composition is composed essentially of an active (or activatable) material, a fibrillated first polymer and a support-contributing second polymer and it is characterized in that it is porous, and the pores are interconnecting and are formed in-situ by a method which maximizes the accessibility of the active material. The composition is produced from active material and a tripartite system.

The components of the tripartite system should, of course, be compatible and non-reactive with each other and the polymers should be non-reactive in the environment in which the ultimate product will be used. It is essential that the fibrillatable polymer be capable of dispersing in the support-contributing polymer. The specific choice of support-contributing polymer will depend on the ultimate use of the catalyst composition. In general, in addition to serving the dispersing function for the fibrillatable polymer, the support-contributing polymers must be compatible with and chemically stable in the environment in which the material will be used, they must not impede the function of the apparatus for which they are used, and they must serve the structural purpose for which they are intended. It is an advantage of the present materials that they can be provided with strength and structural integrity combined with flexibility depending on the choice of polymer. The use of the support-contributing polymer in addition to the fibrillatable polymer adds another dimension of freedom to the system. By way of illustration, the following polymers can be used either individually or in suitable combinations: polyolefins, such as polyethylene, polypropylene, polybutylene, polyisobutylene or co-polymers thereof with ethylacrylate and/or vinyl acetate, halogenated polyhydrocarbons and copolymers; polyamides, polysulfones; polyacetates, polycarbonates; polyesters; cellulose esters; or silicones. Preferred support-contributing polymer compositions for catalyst members are thermoplastic polymers such as polyolefins, e.g., polyethylene and polypropylene and copolymers thereof because they are substantially saturated compounds and as such would have no interaction with the active material.

The fibrillatable polymers should, of course, be compatible with the support-contributing polymer and be capable of dispersing in it, and it should be non-reactive with the environment in which it is to be used. Fluorocarbon and propylene polymers have these suitable characteristics. To be particularly useful for the process of the present invention, it is also important for the polymer to be fibrillatable in a dry-type process. Such polymers are known. For example, polytetrafluoroethylene (PTFE) can be fibrillated from a dry powder and it is commercially available as duPont's "Teflon" 6A and 7A. Polypropylene is available as strands, tape or film which can be used, e.g., as such or cut or chopped to appropriate size. The fibrous component is effective even when present in small amounts, e.g. about 0.5 to 5%, typically about 1–2%, by weight of the catalyst composition.

The pore-forming component of the tripartite system must be removable since, to develop the porous active composition, after fibrillation the pore-former agent is removed leaving the active particles encradled by fibers. The pore-forming component is further characterized in that it is non-reactive with the active material and other components of the system and it wets or can be made to wet the surfaces of the active material. That is, the pore-forming agents will spread on or can be made to spread on the active material. It is preferred that the pore-former be capable of serving as a processing agent in the system, and if so, that it melts below the temperature at which the active material will react. By removable is meant that the pore-former can be removed in any way that is not harmful to the remaining components and in a way that will leave the remaining material in a porous condition. In accordance with the present invention, the pore-former serves as incipient sites for the pores and, after removal, the pores can be interconnecting and dispersed throughout the remaining material. The pore-former may be, for example, leachable directly, convertible to leachable compositions or to gaseous products. Leachable pore-forming agents may be selected, for example, from water-soluble, base-soluble, acid-soluble or organic solvent-soluble resins. Water-soluble resins can be removed by leaching with water. It is noted in this regard that addition of water to the formulated fibrous material is not critical or disadvantageous since water added at this stage does not interfere with the advantageous freedom in processing of the dry mix. Examples of pore-formers of the water-soluble type are polyolefin oxides such as polyethylene oxide and polypropylene oxide. Examples of other leachable pore-formers can be leachable are polyethylenimine, which can be leached with dilute sulfuric acid; polyacrylic acid, which can be leached with dilute sodium hydroxide; and paraffin waxes, which can be leached with halogenated solvents. Removal can also be effected by enzymatic breakdown. Generally, it is possible to use any of the known pore-forming techniques for polymers so long as it is compatible with the system.

A preferred characteristic of the pore-former of this invention is that it is a polymer. As such it is compatible with the fribrillatable polymer and can serve as a system without the need for using very large quantities of additives which must be removed from the fibrillatable polymer e.g. by filtration, before dry processing. That is, the polymeric pore-former serves as the medium which permits the combination of other components of the system to be uniformly distributed and conveniently worked. The amount used is predetermined primarily by the amount of porosity desired and not by the processing needs of the fibrillatable polymer. And in accordance with the present invention, processing can be carried out in standard polymer processing equipment. Since, the pore-former is by definition removable, no unwanted ingredients are added to the system. A further advantage of using a polymeric pore-former is that it can be used at normal working temperatures for polytetrafluoroethylene or polypropylene, i.e. about 75°–100° F. without reaching a hazardous flash point. For example, Stoddard solvent, which is sometimes considered a medium for working polytetrafluoroethylene, is unsuitable for the present process because it has a flash point of 100° to 110° F. Vehicles also not suitable for the present process are those, such as low molecular weight paraffins, naphthenes, or aromatics such as naphthalene, benzene, or industrial solvents which are mixtures of various organic compounds, e.g. Shell-Sol B or mineral spirits, which may volatilize during working on the processing equipment. A critical problem with vehicles which volatilize during processing in that the pore-former is removed before it can serve as the incipient sites for the pores.

As indicated above, the pore-forming agents, apart from being removable, are further characterized in that they are non-reactive with the active material and polymeric material, and they wet or can be made to wet the active material. It is believed that if the pore-former coats (in other words wets or spreads on) the surface active material, i.e. before removal, this will contribute to the accessibility of the active materials when the pore-former is removed. A surfactant may be added to improve the wettability of the pore-former. Generally, it is desirable to use low temperatures, and particularly to avoid sintering or reacting temperatures in preparing or otherwise treating catalyst materials.

Pore-formers such as certain polyolefin oxides, e.g. polyethylene oxide and polypropylene oxide, in addition to being conveniently water-soluble and having suitable melting temperatures, (e.g. polyethylene oxide melts below 75° C.), have the advantage that they serve as both pore-forming and processing agents for fibrillatable polymers such as polytetrafluoroethylene and polypropylene. In general, such pore-formers have molecular weights in the neighborhood of 100,000 to 1,000,000.

The amount of pore-former to be incorporated in the precursor catalyst composition is dependent on the amount of porosity desired in the ultimate product. In general, the pore-former is present in the precursor material in a major amount, i.e. at least about 10% by weight, typically about 15% to about 50%, and preferably over 25 or 30 weight %. In a catalyst system, for example, it is desirable to have maximum exposure of the active material and to have free movement of reacting medium throughout the mass. To achieve this, the porous, polymeric active composition, preferably, has about 70 to 80 volume % porosity, and the pores should be interconnecting. For such porosity, an equivalent volume % of leachable pore-former is needed in the precursor catalyst composition, i.e. about 70 to 80 volume %. This is equivalent to about 15 to 50 weight % of polyethylene oxide. To obtain porosity of this extent and type using a fugitive gaseous pore-former considerably more pore-former would be necessary, and this could be estimated based on the volume of gas produced and conditions.

The polymeric catalyst composition is comprised, generally, of at least about 50%, by weight, catalyst particles, and preferably of about 75% to 95%. Typically the catalyst composition is comprised, by weight, of about 75% to about 90% catalyst, about 1% to about 5% fibrillated polymer, and the balance essentially support-contributing polymer.

The catalyst material, which is the predominant component of the catalyst system, is determined by the ultimate use of the material. The catalyst material can be active or activatable even after incorporation in the catalyst system under suitable conditions well known in the catalyst art. As used herein the term active catalyst material includes activatable catalyst material.

Catalytically active materials are well known to those skilled in many different chemical processing disciplines. The number of naturally occurring and synthesized catalysts is vast. They can be simple or complex, inorganic or organic, metallic or non-metallic. It is known to use promoters and poisons for the active materials, and the catalysts may be used unsupported or supported on carriers. The carriers (e.g. silica, aluminum, magnesia, etc.) may be essentially inert or may affect the reaction or reactivity of the catalysts. No attempt is made here to define this very complex subject. The present invention is not restricted to any catalyst or group of catalysts. The catalytically active material may consist substantially of the catalytic material per se or it may be comprised of active material and other components which are related to the active material or its function in the polymeric composition. For example, the catalyst material may include promoters or poisons. It may be unsupported or deposited on a carrier. The active material may also include components or components in special form which will enhance the thermal or electrical properties of the composition. By way of example, it is well known to use platinum group metals, nickel, cobalt, molybdenum, rhenium, silver, copper, in elemental form or as alloys or compounds or other combinations in hydrogenation, oxidation, dehydrogenation, isomerization and petroleum reforming reactions. It is well known to use catalysts to effect reactions under more favorable conditions and/or with greater selectivity. The selection of active materials and the processes to which they can be applied are limited to the temperature ranges dictated by the thermal and chemical stability of the polymeric material used in the structure of the present invention.

Typically, the tripartite system from which the fibrillated, porous polymer is developed will have the following composition in parts by weight:

| Component Type | Example | Typical Range (approx) |
|---|---|---|
| Support-Contributing Polymer | Low Density Polyethylene | 5 to 10 |
| Fibrillatable Polymer | Teflon 7A | 1 to 5 |
| Leachable Resin | Polyox WRSN-10 | 40 to 60 |

To this mixture may be added, e.g. 142 parts of catalytic materials, e.g. Ni powder or Pt deposited on an $Al_2O_3$ carrier. The relative ratio of polymer: active material will vary, e.g. according to the processing technique and equipment used.

The porous, polymeric catalyst system is prepared by a method comprising subjecting the initial components (i.e. the fibrillatable polymer, the support-contributing polymer, a catalyst material, and a pore-former which is removable and serves as a processing agent), in particulate form, to shear stresses to fibrillate the polymer by a dry process technique and to form a homogeneous dispersion of discontinuous fibers through the catalyst material and pore-former, processing the fibrillated polymeric dispersion to sheet form, and then removing the pore-former. The components can be all blended together initially, e.g. in a blender such as a Banbury mixer or a ball mill, and then processed in an extruder. Alternatively, the components can be mixed with each other and processed in various sequences depending on the desired form of the material and the equipment used. For example, the initial components can be milled, between the surfaces of two rotating heated rollers for a time sufficient to convert the polymers into fibrous form. During the milling, the active material and pore-formers can be homogeneously mixed and the fibers can be distributed throughout the mixture. The product from the mill can be peeled from the rollers in sheet form. Porosity is obtained by removing the pore-former. Alternatively, the powders can be blended first and then extruded, injection molded, blown into film, etc. Advantageously, the fibrillatable component is processed in-situ to the fibrous component of the precursor polymeric composition. By fibrillated in-situ is meant that it is fibrillated in the presence of at least one component of the composition, e.g., the active material. By removal of the pore-former the precursor polymeric composition is converted to the porous product.

The pore-former can be removed from the sheet at any convenient time. The catalyst system can be made as a flexible film in any desired thickness, and the porosity can be controlled with a suitable pore-former. For example, the catalyst system can be formed as a thin, flexible, coherent sheet having a thickness of about 1 to about 10 mils and having structural integrity. The film can be used in a single thickness or as multiple layers, supported or unsupported, depending on the demands of the system.

In one embodiment of the present invention, the polymeric-bonded catalytic composition of the present invention is prepared by forming a dry mixture of the support-contributing polymer, the fibrillatable polymer, a removable pore-former, and the catalyst material in a blending vessel such as a Banbury mixer or a ball mill until the ingredients are completely blended (typically about 10 to 30 minutes) at an elevated temperature, but below the degradation temperature of any components, and then the dry mix can be subjected to shearing stresses, e.g., in an extruder or a roll-mill, using sequential additions. The material can be processed directly to sheet, e.g. in a roll-type mill, or it can be extruded on to a calender.

In a system in which polyethylene is the support-contributing polymer and a water-soluble resin such as polyethylene oxide is the pore-former, mixing can be carried out as a continuous process simultaneously with fibrillation, e.g. in a two-roll mill at 65°–75° C., using the addition sequence: (1) support-contributing polymer, (2) removable resin, (3) fibrillatable polymer, (4) active material. As one alternative, batch compounding can be carried out in several sequences, in a mixing vessel such as a Banbury mixer or a twin-screw extruder. For example, pre-fibrillation of the fiber-forming agent such as Teflon 7A and active materials can be carried out in a mixer to create maximum fibrillation and dispersion of fibers in the active material. This material is removed from the mixer. The mixer is pre-heated to a temperature of 75°–100° C. and operated at a controlled mixing speed of 14 RPM. The mixing addition sequence is as follows: First, the polymer and water-soluble resin are added to the mixer and mixed at a temperature of about 75°–100° C., for about 5 to 10 minutes to insure fluxing. Next, a pre-blend of active material and fibrillated polymer (such as Teflon 7A) is added. The total composition is mixed for an additional 5–10 minutes. The resultant mixture is removed from the mixer and pressed into sheets for pelletizing. The pellets can be processed to sheet form e.g. by extrusion, compression molding, injection molding or roll calendering. The sheets are leached with water to remove the pore-former and then dried.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A catalyst composition said composition being in the form of a sheet comprising a catalyst material encradled in a porous, fiber-containing polymeric material, said polymeric material comprising a fibrillated first polymer and a support-contributing polymer, and said polymeric material having porosity therethrough, and said composition being developed from a catalyst material, a fibrillatable first polymer, a support-contributing second polymer and a major amount of a removable pore-former, said porosity being developed on removal of the pore-former.

2. A catalyst composition in accordance with claim 1, characterized in that the pore-former is capable of wetting the catalyst material on being mixed therewith.

3. A catalyst composition in accordance with claim 1, characterized in that the pore-former prior to removal is present in an amount of about 15 to about 50 weight percent.

4. A catalyst composition in accordance with claim 1, characterized in that it is comprised by weight of at least about 50% catalytically active particles.

5. A catalyst composition in accordance with claim 1, characterized in that the pore-former comprises a polymer.

6. A catalyst composition according to claim 1, characterized in that the active catalyst comprises at least one of nickel, cobalt, molybdenum, copper, silver, platinum group metals, and compounds, alloys and mixtures thereof.

7. A catalyst composition according to claim 1, characterized in that the support-contributing polymer comprises a thermoplastic resin and the fibrillatable polymer comprises polypropylene or a halogenated polyolefin.

8. A catalyst composition according to claim 7, characterized in that the removable pore-former comprises a water-soluble polyolefin oxide.

9. A catalyst composition according to claim 1, characterized in that the sheet is thin and flexible.

10. A catalyst composition according to claim 1, characterized in that the catalyst is a thin, coherent sheet having a thickness of about 1 to about 10 mils.

11. A catalyst composition according to claim 1, characterized in that it is comprised, by weight, of about 50% to about 75% catalyst material, about 1% to about 5% fibrillated polymer, and the balance essentially support-contributing polymer.

12. A method of preparing a catalyst composition, said catalyst composition being in the form of a thin, porous, flexible sheet, comprising subjecting a catalyst material, a fibrillatable first polymer, a support-contributing second polymer, and a major amount of removable pore-former to conditions to convert the fibrillatable polymer to fibers, and to mix intimately said components, processing the resultant fibrillated polymeric material into sheet form, and then removing the pore-former.

13. A method according to claim 12, characterized in that the fibrillatable first polymer is converted to fibrous form in-situ by a dry processing technique.

14. A method according to claim 12, characterized in that the catalyst material is produced in sheet form in standard polymer processing equipment.

15. A method according to claim 12, characterized in that the resulting porosity after removal of the pore-former is interconnecting and dispersed throughout the catalyst composition.

16. A method according to claim 14, characterized in that the equipment is a roll-type mill, an extruder or a molding apparatus.

* * * * *